United States Patent
Nakano et al.

(10) Patent No.: US 6,928,125 B2
(45) Date of Patent: Aug. 9, 2005

(54) RECORDING STATE DETECTION SYSTEM FOR USE IN A DISK DRIVE

(75) Inventors: Masaki Nakano, Tokyo (JP); Hiromi Honma, Tokyo (JP); Masaki Hidano, Tokyo (JP)

(73) Assignee: NEC Corporation, Tokyo (JP)

( * ) Notice: Subject to any disclaimer, the term of this patent is extended or adjusted under 35 U.S.C. 154(b) by 784 days.

(21) Appl. No.: 10/027,737

(22) Filed: Dec. 21, 2001

(65) Prior Publication Data

US 2002/0114411 A1 Aug. 22, 2002

(30) Foreign Application Priority Data

Dec. 27, 2000 (JP) ........................................ 2000-397828

(51) Int. Cl.[7] .............................................. H03D 1/00
(52) U.S. Cl. ......................................................... 375/341
(58) Field of Search ................................ 375/341, 265, 375/324, 262; 714/795, 824, 798

(56) References Cited

U.S. PATENT DOCUMENTS

| | | | | |
|---|---|---|---|---|
| 5,530,708 A | * | 6/1996 | Miya | 714/795 |
| 5,838,697 A | * | 11/1998 | Abe | 714/796 |
| 5,938,790 A | * | 8/1999 | Marrow | 714/795 |
| 6,029,268 A | * | 2/2000 | Kong et al. | 714/795 |
| 6,108,384 A | * | 8/2000 | Okumura et al. | 375/262 |
| 6,118,826 A | * | 9/2000 | Zehavi et al. | 375/261 |
| 6,459,669 B1 | * | 10/2002 | Fujita et al. | 369/59.1 |
| 6,704,154 B2 | * | 3/2004 | Hirano et al. | 360/40 |

FOREIGN PATENT DOCUMENTS

| | | |
|---|---|---|
| JP | 06195713 A | 7/1994 |
| JP | 07141659 A | 6/1995 |
| JP | 07153078 A | 6/1995 |
| JP | 09204665 A | 8/1997 |
| JP | 10055540 A | 2/1998 |

OTHER PUBLICATIONS

Viterbi, Andrew J., "Convolutional Codes and Their Performance in Communication Systems", *IEEE Transactions On Communications Technology*, vol. COM–19, No. 5, pp 751–772, Oct. 1971.

Itoi S. et al., "A PRML System on the Optical Video Disk Recorder", 1994 ITEE Annual Convention, pp 287–288.

* cited by examiner

*Primary Examiner*—Emmanuel Bayard
(74) *Attorney, Agent, or Firm*—Choate, Hall & Stewart LLP

(57) ABSTRACT

A recording state detection system includes a Viterbi detection unit, an error calculation unit for calculating error data series representing a difference between each sample data of the reproduced data series and a corresponding data of the data series output from the Viterbi detection unit, a normal level judgement unit for judging the normal level of each sample data, and a state calculation unit for calculating the amplitude data and the asymmetry of the sample data series based on the error data series and the normal level. The disk drive unit corrects a recording optical power based on the calculated amplitude and the asymmetry.

8 Claims, 8 Drawing Sheets

RECORDING STATE DETECTION SYSTEM FOR USE IN A DISK DRIVE

BACKGROUND OF THE INVENTION (a) Field of the Invention

The present invention relates to a recording state detection system for use in a disk drive or data recording/reproducing device and, more particularly, to a reliable data reproducing technique for reproducing data on a recording disk with high reliability and a simple structure.

(b) Description of the Related Art

Intensive studies for developing optical disk drives, such as a digital versatile disk (DVD) drive, and magnetic disk drives are performed for achieving a high-density and large-capacity disk drive. Among other disks, a rewritable optical disk attracts a larger attention due to the advantages of a large capacity and removability thereof.

In an optical disk drive, a semiconductor laser is generally used for recording/reproducing data on the disk, wherein the recorded data is reproduced by focusing a laser beam onto the recording surface of the disk to detect the reflected beam which is modulated by the recorded mark formed on the disk. The detected optical signal is converted into an electric signal, which is fed to a reproducing unit of the disk drive. The reproducing unit includes a waveform equalizer, an automatic gain controller, an encoder or A/D converter etc, and thereby converts an input analog signal into digital data.

The reproduced digital data from the reproducing unit is fed to a PLL (phase lock loop) circuit, which generates a reproducing clock signal in synchrony with the reproduced digital data. The reproducing clock signal and the reproduced digital data are then delivered to a data discriminator for discrimination of data between "1" and "0", thereby demodulating the reproduced digital data.

In general, data is recorded onto the recording disk by irradiating a recording laser beam, having a higher optical power than the reproducing laser beam, onto the recording surface of the disk to thereby form recorded marks thereon. The optical power of the recording laser beam should be accurately controlled in view of forming a smaller-size mark with accuracy for achieving higher-density recording on the rewritable optical disk. It is difficult, however, to obtain a suitable temperature distribution on the recording surface of the disk in a practical disk drive, even if the optical power is accurately controlled, due to the change of the laser wavelength, distortion of the optical spot, dynamic fluctuation of the ambient temperature and so on.

On the other hand, it is known that the recording disks have variance or scattering in the sensitivity for recording. Thus, upon replacement of the recording disk in the disk drive, a test recording is conducted on a test area of the recording disk before the recording, thereby optimizing the optical power of the disk drive to improve the adaptation between the recording disk and the disk drive. A technique for the test recording is described in JP-A-6-195713, for example.

The technique for obtaining the optimum optical power is described in JP-A-7-153078, wherein a mean difference in the optical power level is detected for a combination pattern having a highest-density pattern and a lowest-density pattern, and the optimum optical power is selected which provides a lowest mean difference (substantially zero difference) therebetween to achieve a symmetry. The user data is recorded onto an optical disk by using the optimum recording optical power, and reproduced therefrom by using a somewhat lower reproducing optical power.

JP-A-9-204665 describes another recording technique using a recording optical power which is obtained by adding a specified value to a recording power wherein the amplitude center of the reproduced signal coincides, or multiplexing the same by a specified value, in view that the recording power which allows the amplitude centers to coincide is not necessarily an optimum recording power which provides a lowest jitter to the reproduced signal.

JP-A-10-55540 describes a technique for obtaining an optimum recording power in a phase change disk, wherein a single single pattern having a plurality of repeated marks which are longer than the optical spot is selected as the test pattern, and the optimum recording power is set at the duty ratio of the reproduced signal therefrom, which is obtained from a mean level and an auto-sliced level of an envelope of the reproduced signal. This is adopted based on the fact that the degree of degradation differs depending on the recorded pattern for the phase change disk. In this technique, it is to be noted that JP-A-7-141659 describes a technique for accurately detecting the asymmetry to determine the optimum recording power.

Several techniques are known for achieving a higher-reliability reproduction of data on the optical disk. In one of these techniques, a direct judgement circuit is used wherein data is encoded by slicing a detected signal. This technique is categorized as a hard decision technique. On the other hand, there are also known soft decision techniques which include a maximum likelihood detection technique, wherein both the preceding and succeeding bits are considered for determining the subject bit of the reproduced data, and a partial response maximum likelihood (PRML) signaling technique which combines a partial response waveform equalization technique and the maximum likelihood detection technique.

The PRML signaling technique detects a maximum likelihood after correcting the reproduced signal by using a waveform equalization technique, thereby adapting the maximum likelihood detector to the specified characteristics of the reproducing channel used therein. For example, a literature entitled "A PRML System on the Optical Video Disk Recorder" in the proceedings of 1994 ITE annual convention, pp287–288 describes the PRML technique.

In an optical disk or a magnetic disk, a high intersymbol interference reduces the reproduced amplitude during reproducing high-density data on the disk. This reduces the SNR (signal-to-noise ratio) for the magnetic disk and the CNR (carrier-to-noise ratio) for the optical disk, both increasing the bit error rate in the reproduced data. The maximum likelihood detection technique detects the data by taking advantage of the characteristics of the reproducing channel having a specified state transition scheme, whereby a minimum RMS (root mean square) of the errors is selected among the RMS of the errors for all the time series patterns conceivable from the characteristics of the reproducing channel. This allows detection of data at a lower bit error rate even with a lower SNR or CNR. In view that this procedure is difficult to use in a practical circuit, an algorithm called Viterbi algorithm, described in "IEEE Transaction on Communication, vol. COM-19, Oct. 1971", is used for progressively selecting the data path.

The PRML signaling technique will be briefly described hereinafter with reference to FIGS. 1, 2 and 3 while exemplifying a case wherein the most simple channel, PR(1,1) channel, is used for detecting the PRML during reproducing data on an optical disk. The signal reproduced by an optical head is first corrected to generate a PR(1,1) channel by using, for example, an equalizer typically known as a transversal filter. The signal distribution of PR(1,1) channel is exemplified in FIG. 1, wherein the reproduced signals in the channel are distributed on three normal levels Ni, which includes maximum, median and minimum of the normal levels, such as Ni=+1, 0, −1). In this case, the amplitude information Xi encoded at each channel clock changes between two states $S_t=0$ and $S_t=1$, as shown in FIG. 2, for possible transitions between −1 and 0, 0 and 1, 0 and 0, and 1 and 1.

The most likelihood detection technique is to detect one of the normal level (Ni) series which provides a minimum of square error sum Zn which is defined by the sum of the square of errors Ei=Xi−Ni, as follows:

$$z_n = \sum_{i}^{n} (xi - Ni)^2. \tag{1}$$

It is difficult, however, to calculate in real time the Ni which provides a minimum for the square error sum $z_n$ by calculating for all the possible Ni series. Thus, the Viterbi algorithm is used in this procedure for determining the normal level series Ni. FIG. 3 shows a trellis diagram showing the state transitions of FIG. 2 exploded on a time axis. In the Viterbi algorithm, for each of the two paths input to the state at time instant n, the square error sum $z_n$ is calculated from $Z_{n-1}$ at the time instant n−1 and the value for $x_n$ input at time instant n, followed by selecting one of the square error sums $z_n$ for the two paths having a lower value. The term "path" as used herein means a graph or route connecting a state and the succeeding state and having a direction therebetween.

The selection of one of the two paths at each time instant in the trellis diagram while back-tracing the paths from the present state toward the past states enables to find a state at which the paths merge (converge). This is called "merge of the paths". The merging of the paths into a single path means that the reproduced data is fixed, whereby the output corresponding to the path is the result of the detected data. The square error sum $z_n$ is generally called a path metric, whereas the path metric at a time instant is called a branch metric.

The Viterbi algorithm is adapted to the state transition of FIG. 2 based on the following progressive formulas:

$$M_n(S_0) = \min[M_{n-1}(S_0) + (x_n+1)^2, M_{n-1}(S_1) + x_n^2]; \text{ and}$$
$$M_n(S_1) = \min[M_{n-1}(S_1) + (x_n-1)^2, M_{n-1}(S_0) + x_n^2] \tag{2},$$

wherein $M_n(S_1)$ represents the square error sum $z_n$ for the case of $S_1$ at the time instant n, min[a,b] represents a function which assumes the value "a" or "b" depending on which value is the minimum, and $S_0$ and $S_1$ represent two states having different values. The path metric is calculated for each of two paths input to each of the states $S_0$ and $S_1$ at the prior time instant, followed by selection of one of the path metrics having a lower value to update the value for the path metric. FIG. 3 shows thick paths having probability at the time instant t9 after the selection of one of the paths at each time instant based on the formulas (2). In this example, the paths are not merged or fixed between t0 and t6, and the paths are merged or fixed between t7 and t9. After the merge of the paths, the paths prior to the merge point are fixed, and thus the outputs qi corresponding to the fixed paths are consecutively delivered for allowing the most likelihood detection.

FIG. 4 shows an example of the Viterbi detector 10 including a branch metric generator 11, ACS (add/compare/select) circuit 12 and a path memory unit 13. FIG. 5 shows the branch metric generator 11, which receives input signal $y_i$ to generate specific signals $(y_i+1)^2$, $y_i^2$ and $(y_i-1)^2$. These specific signals are fed to the ACS circuit 12, which adds these specific signals to the path metric signals $M_n(S_0)$ and $M_n(S_1)$, compares the added data against each other, selects one of the added data for updating the current path metric signals. By iterating these procedures, the paths are merged, thereby allowing detection of the maximum likelihood. In addition, the result of the comparison representing the path selection information is stored in the path memory unit 13 and then output as the bit information corresponding to the fixed paths before the merge, whereby the data detection is performed.

In the technique described in JP-A-7-153078, the recording (optical) power, determined by a specified test pattern recorded in a specified area for adjusting the optimum recording power, necessitates recording/reproducing the specified test pattern after moving the optical head to the specified area. In addition, an analog circuit is used as the asymmetric detection circuit for detecting the specified pattern. Further, the shortest signal for use in the asymmetry detection has a smaller CNR after high-density recording, which degrades the detection accuracy.

In the technique described in JP-A-9-204665, in view that the recording optical power wherein the amplitude centers of the reproduced signal coincide with each other is not necessarily such that provides a minimum jitter for the reproduced signal, the technique uses a recording power obtained by adding or multiplying a specified value to/by the thus obtained recording optical power. However, in the Viterbi detector, it is important to form a recording mark adapted to the characteristics of the reproducing channel, and a recording technique without the symmetry does not necessarily provide an optimum recording. In addition, since there are a plurality of combinations for the disk drive and the disk, the constants provided for respective combinations of the disks are difficult to determine.

SUMMARY OF THE INVENTION

In view of the above problems in the conventional techniques, it is an object of the present invention to provide a state detection system for use in a disk drive, which is capable of being adapted to substantially any type of the reproducing channel and detecting the state of the recorded data without using a specified pattern.

It is another object of the present invention to provide a recording/reproducing system having such a state detection system.

The present invention provides a recording state detection system including: recording state detection system including: a data correction unit having a data correction function, the data correction unit receiving an encoded sample data series to output a first data series, the encoded sample data series being read from recorded data digitally recorded on a recording disk; a normal level judgement unit for receiving the first data series to estimate a normal level for each sample of the encoded sample data series to output a normal level data series; an error calculation unit for calculating a difference between each sample of the encoded sample data series and a corresponding data of the first data series to output an error data series; a state calculation unit for estimating a state of the recorded data including information of an amplitude of the recorded data based on the error data series and the normal level data series.

In accordance with the recording data detection system of the present invention, the state calculation unit calculating the state of the recorded data based on the error data series and the normal level data series is adapted any reproducing channel of the drive unit so long as the reproducing pulsing data is detected.

The above and other objects, features and advantages of the present invention will be more apparent from the following description, referring to the accompanying drawings.

PREFERRED EMBODIMENTS OF THE INVENTION

Figure 1:
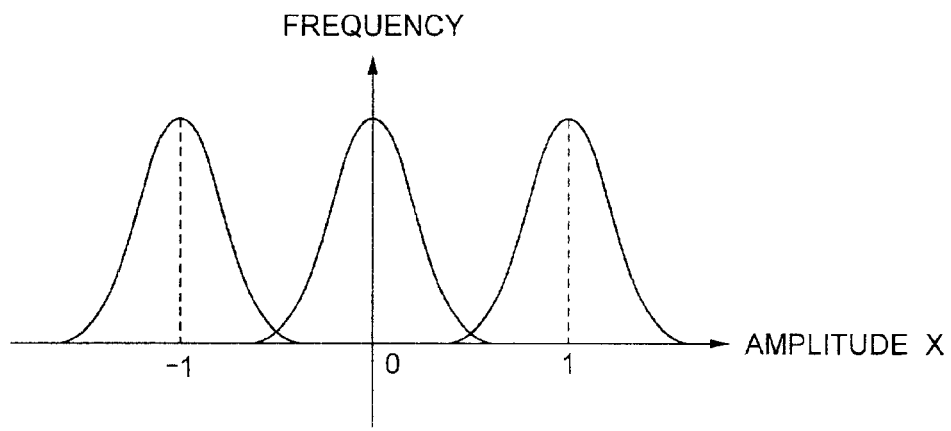
FIG. 1 is a frequency distribution of sample data in the PR(1,1) channel.

Now, the present invention is more specifically described with reference to accompanying drawings, wherein similar constituent elements are designated by similar reference numerals throughout the drawings.

Figure 6:
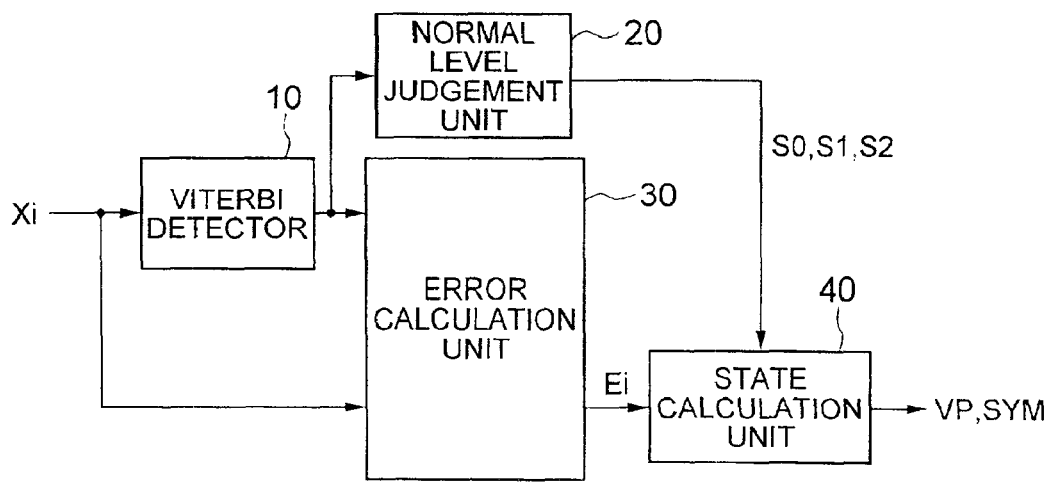
FIG. 6 is a state detection system according to an embodiment of the present invention.

Referring to FIG. 6, a recording state detection system according to an embodiment of the present invention is used in a disk drive for detecting the state of the data recorded on a recording disk, outputting amplitude information Vp and asymmetry information SYM of the data reproduced from the recorded data, as the output signals of the recording state detection system. The recording state detection system includes a Viterbi detector 10, a normal level judgement unit 20, an error calculation unit 30 and a state calculation unit 40.

An analog signal reproduced by a head on an optical disk is subjected to a specific correction procedure to assume specified channel characteristics by using a band elimination filter and an equalizer (both not shown), and also subjected to conversion using an A/D converter (not shown) into a digital data series Xi, which is called herein reproduced data. The reproduced data Xi is delivered to the Viterbi detector 10 in synchrony with a reproducing clock signal generated by a PLL circuit not shown. A digital equalizer may be provided at the output side of the A/D converter.

The Viterbi detector 10 generates pulsing data series (pulsing data) based on the input reproduced data Xi. The pulsing data is fed to the normal level judgement unit 20 and the error calculation unit 30, the latter calculating a difference between the reproduced data Xi and the pulsing data to output a difference data series to the state calculation unit 40. The state calculation unit 40 detects the amplitude VP and the asymmetry SYM of the reproduced data Xi based on the output from the normal level judgement unit 20, to output the amplitude VP and the asymmetry SYM of the recorded data on the optical disk as the detected data. These detected data is used for judging the state of the recorded data by an optical beam and thus correcting the recording optical power of the optical beam used in the disk drive.

Figure 4:
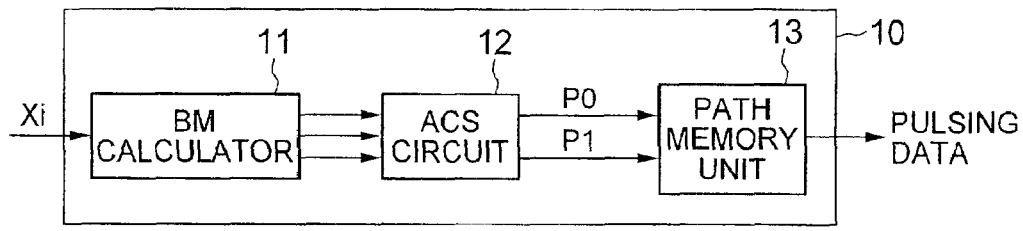
FIG. 4 is a block diagram of a typical Viterbi detector.

The Viterbi detector 10 has the configuration shown in FIG. 4, including a branch metric calculator 11, an ACS circuit 12 and a path memory unit 13. The branch metric calculator 11 has the configuration shown in FIG. 5, including two adders 111 and three multipliers 112.

Figure 2:
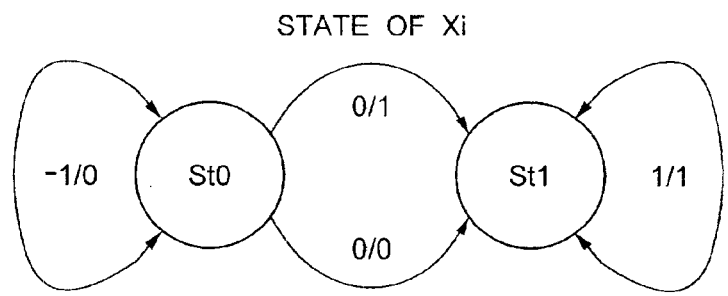
FIG. 2 is a state transition diagram of the PR(1,1) channel.
Figure 3:
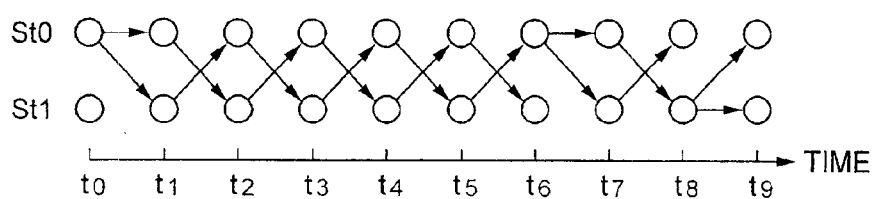
FIG. 3 is a trellis diagram during Viterbi detection in the PR(1,1) channel.

In description of the detail of the Viterbi detector 10 to follow, the case of an optical disk having a PR(1,1) channel exhibiting a state transition such as shown in FIG. 2 is exemplified.

Figure 5:
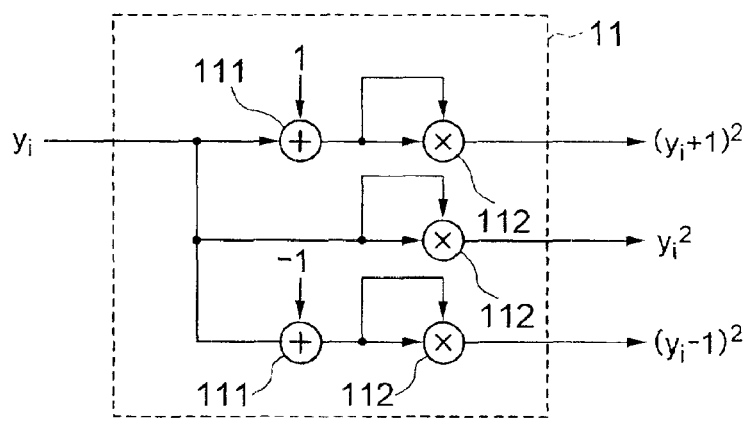
FIG. 5 is a circuit diagram of a typical branch metric (BM) calculator.

In view that the PR(1,1) channel has the distribution on the three normal levels shown in FIG. 1, the typical branch metric calculator 11 shown in FIG. 5 generates three branch metrics $(y_i+1)^2$, $y_i^2$ and $(y_i-1)^2$ corresponding to the three normal levels, $y_i$ being $X_i$ in this embodiment.

Figure 7:
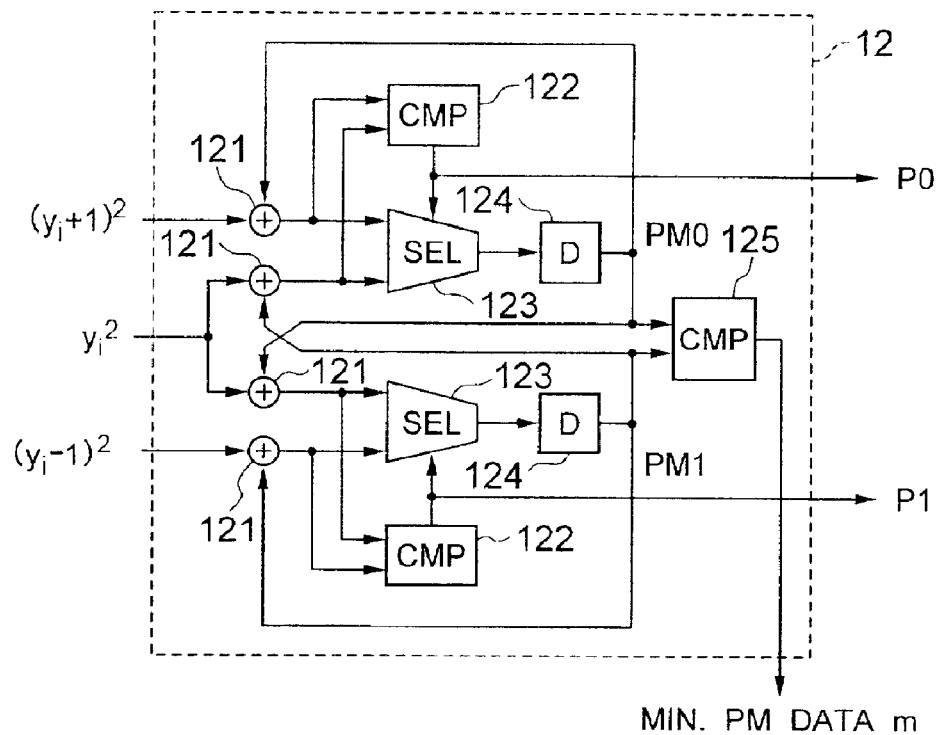
FIG. 7 is a block diagram of the ACS (add/compare/select) circuit shown in FIG. 4.

Referring to FIG. 7, the ACS circuit 12 is such that each of the three branch metrics $(y_i+1)^2$, $y_i^2$ and $(y_i-1)^2$ is added in a corresponding adder 121 to a corresponding one of three preceding path metrics obtained at the preceding time instant, the sum (or path metric) corresponding to $y_i^2$ is compared against each of the sums (or path metrics) corresponding to $(y_i+1)^2$ and $(y_i-1)^2$ in comparator 122, the path metric judged to have a lower value in the comparator 122 is selected by each of the selectors 123 and stored in each of registers 124 as a current path metric.

The result information of the comparison in the comparators 122 is delivered as path selection signals P0 and P1. The current path metrics stored in the registers 124 are compared in the comparator 125 against each other, and information for the lower path metric is delivered as a minimum path metric signal "m".

Figure 8:
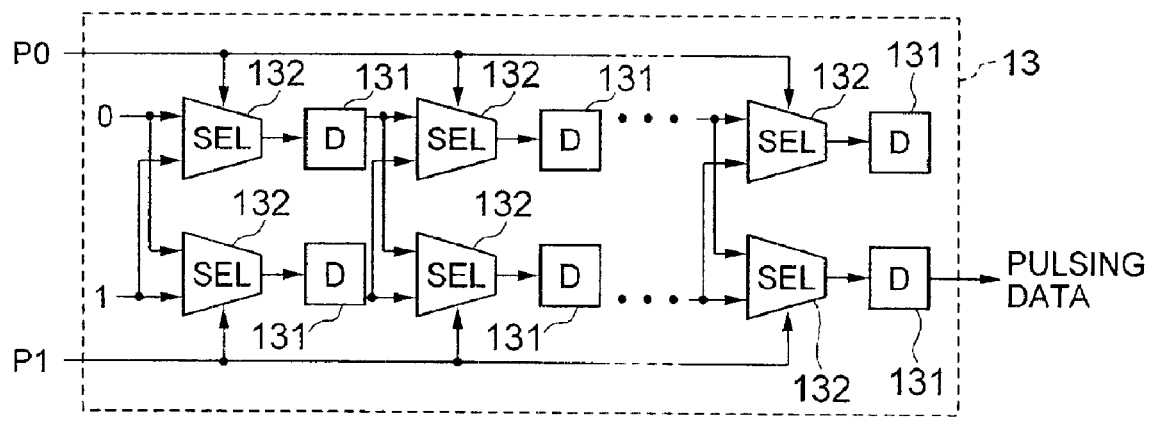
FIG. 8 is a block diagram of the path memory unit shown in FIG. 4.

Referring to FIG. 8, the path memory unit 13 is such that two series of selectors 132 and registers 131 are intercascaded, the path selection signals P0 and P1 are fed to selectors 132 as selection control signals, the output of each selector 132 is stored in a succeeding register 131, the output of which is selected in a succeeding selector 132. Each of the first stage selector pair receives "0" or "1" which corresponds to the output of each path shown in the state transition diagram such as shown in FIG. 2. A sufficient length of two series in the path memory unit 13 allows the detected data in each state eventually merges, whereby the output stage selector pair of the path memory unit 13 deliver the same output value as pulsing data.

Figure 9:
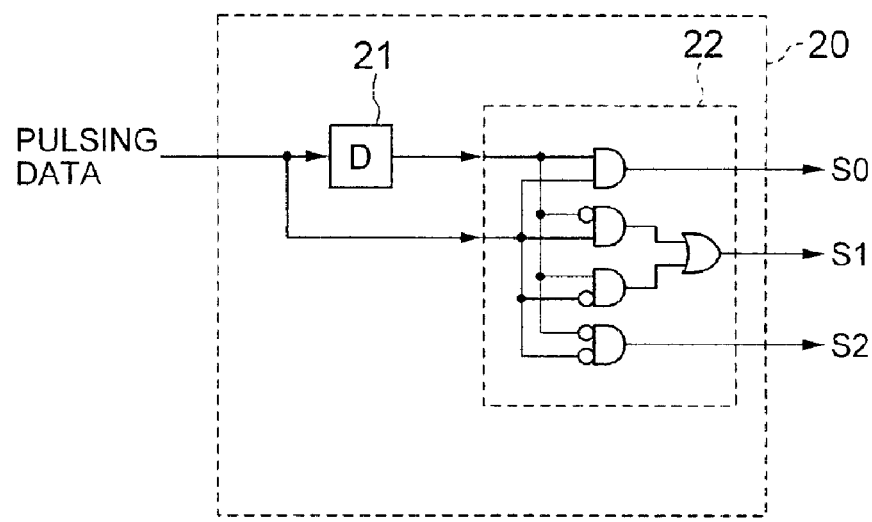
FIG. 9 is a block diagram of the normal level judgement unit shown in FIG. 6.

Referring to FIG. 9, the normal level judgement unit 20 includes a register 21 for receiving pulsing data and a decoder unit 22 receiving the pulsing data directly and the same through the register 21 to estimate the normal level of the pulsing data based on the magnitude thereof, thereby outputting level judgement signals S0, S1 and S2 for each data of the pulsing data.

Figure 10:
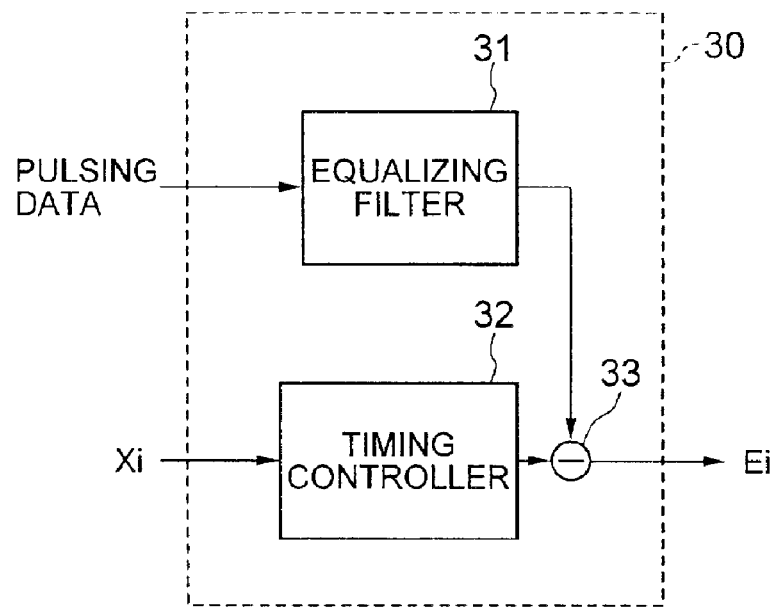
FIG. 10 is a block diagram of the error detection unit shown in FIG. 6.

Referring to FIG. 10, the error calculation unit 30 includes an equalizing filter 31 for receiving the pulsing data, a timing controller 32 for receiving the reproduced data Xi and a subtracter 33 for calculating a difference between the outputs from the timing controller 32 and the equalizing filter 31 to quantitatively evaluate the error between the reproduced data and the pulsing data and output error data series (error data) Ei.

Figure 11:
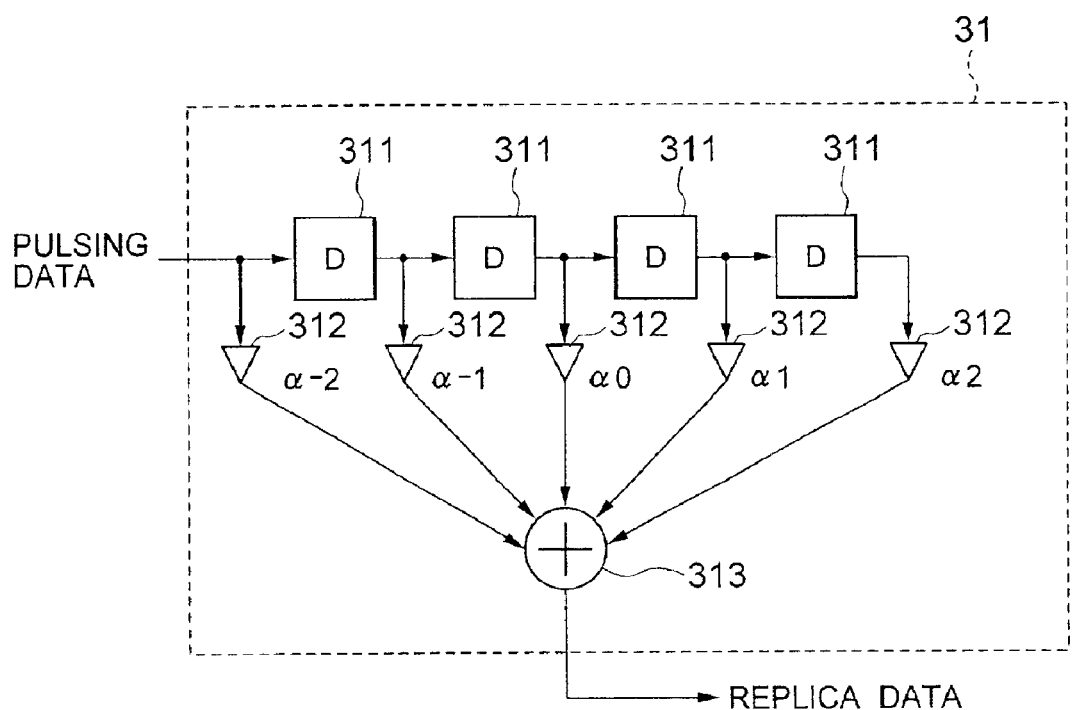
FIG. 11 is a block diagram of the equalizing filter shown in FIG. 10.

Referring to FIG. 11, the equalizing filter 31 is implemented by a transversal filter having (2n+1) taps. The equalizing filter 31 shown therein includes 2n delay gates 311 cascaded from one another, (2n+1) multipliers 312 each for receiving an input signal at a corresponding tap of the transversal filter and a single adder 313 for adding together the outputs from the multipliers 312. Each multiplier 312 has a specified multiplication factor to function as a filter. The equalizing filter 31 has a function for annexing an intersymbol interference between codes of samples at a specified time instant, by adding the time series sampled signals, to generate replica data.

Figure 12:
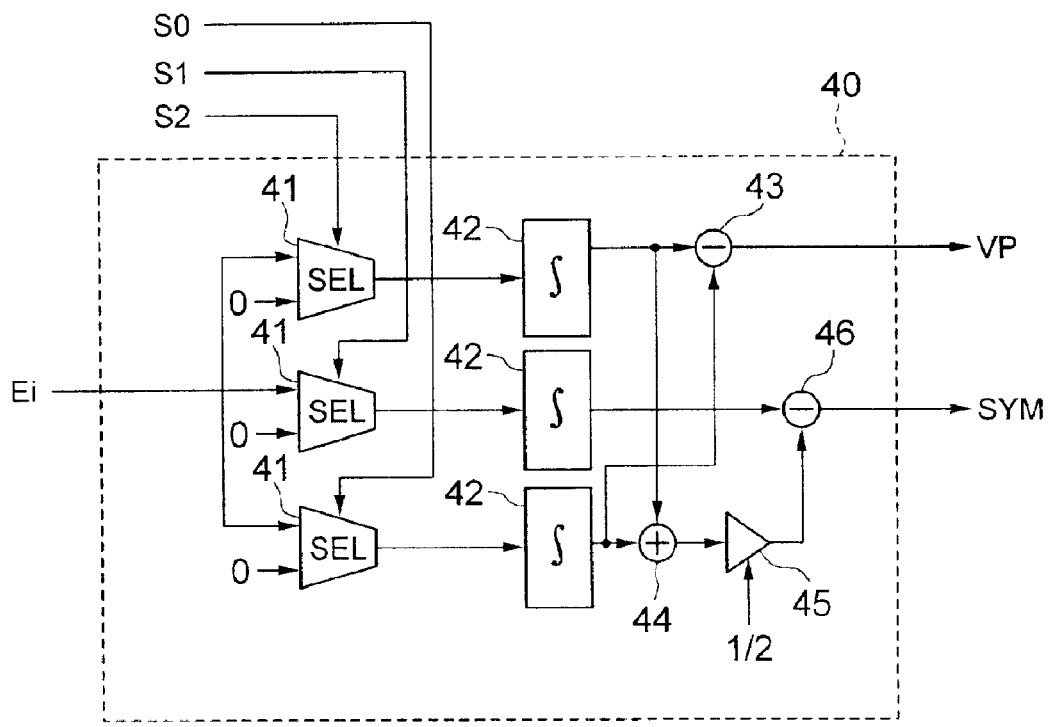
FIG. 12 is a block diagram of the state calculation unit shown in FIG. 6.

Referring to FIG. 12, the state calculation unit 40 generates an amplitude signal VP and an asymmetry signal SYM based on the error data Ei and the level judgement data S0, S1 and S2. The state calculation unit 40 includes three discriminators 41 each receiving one of the level judgement signals S0, S1 and S2 from the normal level judgement unit 20 as selection control signals, the discriminators 41 selecting the error data Ei from the error calculation unit 30 or zero. In this notation, S0, S1 and S2 denoting a maximum normal level, "1", a central normal level, "0", and a minimum normal level, "−1", respectively.

The state calculation unit 40 also includes three integrators 42 each receiving an input signal from a corresponding one of the discriminators 41 to output an integrated data obtained by integrating the input signal up to the sampled number, a subtracter 43 for receiving the integrated data corresponding to the maximum normal level and the integrated data corresponding to the minimum normal level to output a difference signal as an amplitude signal VP, an adder 44 for receiving the integrated data corresponding to the maximum normal level and the integrated data corresponding to the minimum normal level to output a mean signal through a ½-divider 45, and a subtracter 46 for receiving the integrated data corresponding to the central normal level and the mean signal to calculate a difference therebetween. The subtracter 46 outputs an asymmetry signal SYM. The amplitude signal VP and the asymmetry signal SYM are used for judging the state of the recorded data and correcting the recording optical power based on the judgement in the disk drive.

Figure 13:
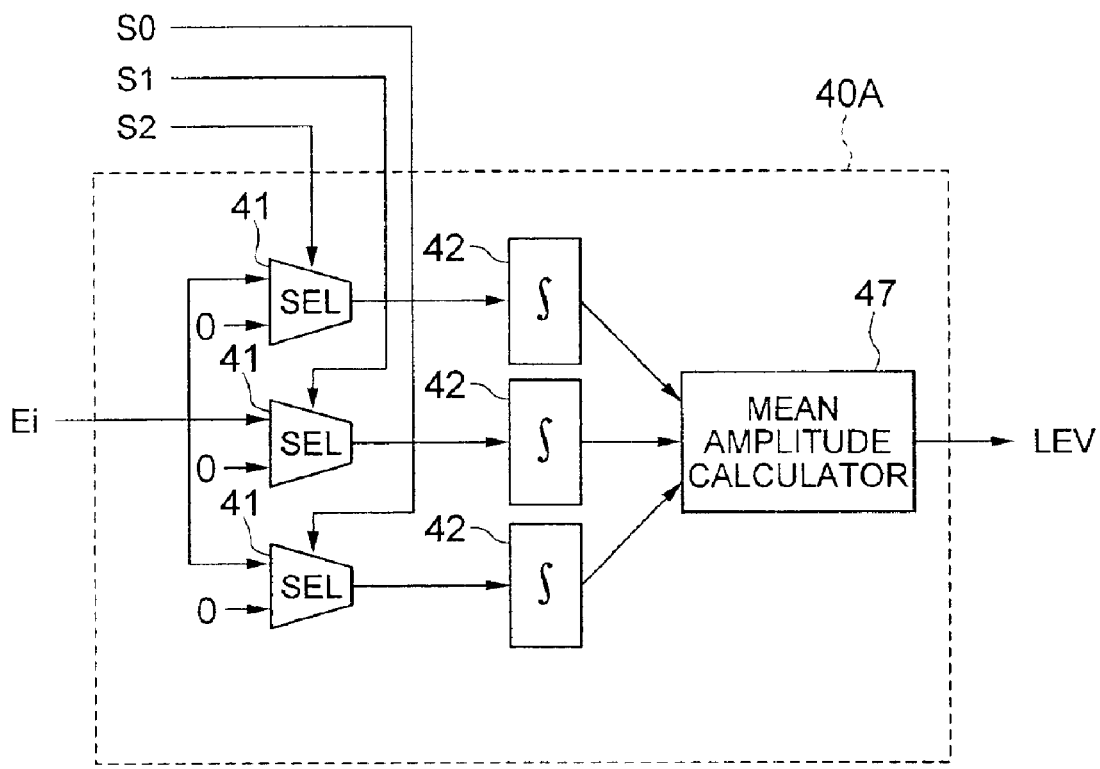
FIG. 13 is a block diagram of another recording state detection unit.

Referring to FIG. 13, in a modified embodiment of the present invention, the state calculation unit 40A is implemented by an amplitude level detector for consecutively detecting the mean amplitude level. The amplitude level detector 40A includes three discriminators 41 similar to those shown in FIG. 12, three integrators 42 similar to those shown in FIG. 12, and a mean calculator 47 for generating a mean signal based on the integrated data of the normal level signals to output an mean amplitude level signal. The mean amplitude level signal is used for judging the state of the recorded data and correcting the recording optical power, similarly to the above embodiment.

Figure 16:
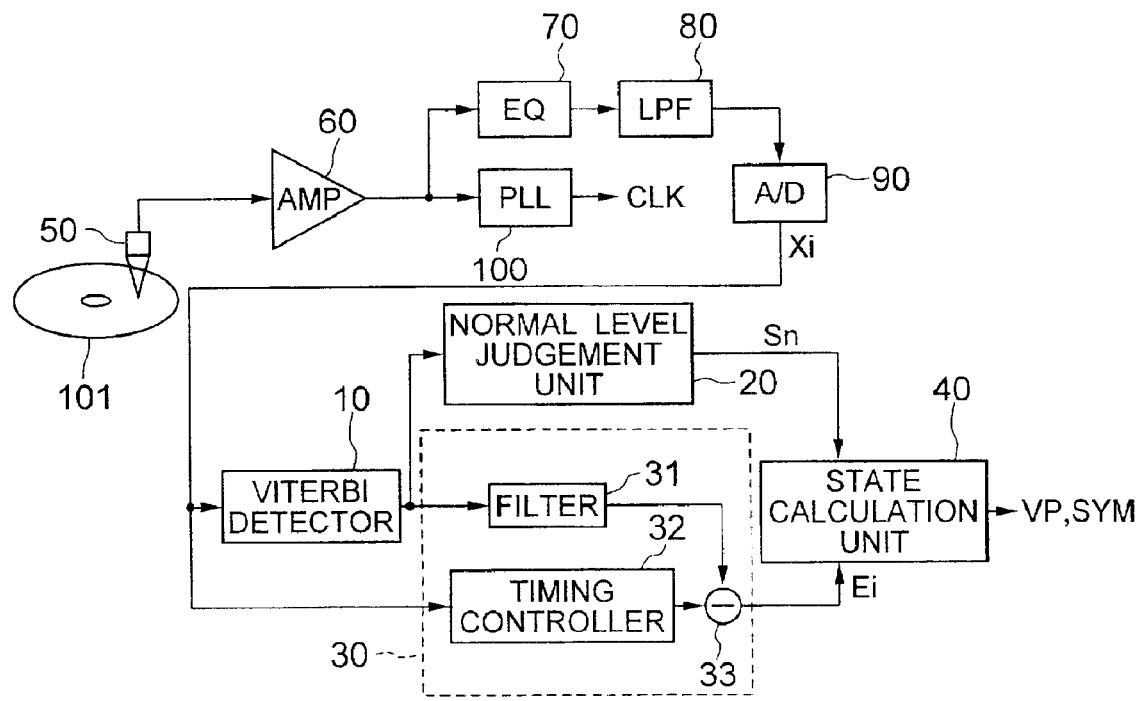
FIG. 16 is a block diagram of an optical disk drive having the recording state detection system of FIG. 6.

Referring to FIG. 16, an optical disk drive having the state detection system of FIG. 6 is such that the data recorded on an optical disk 101 is reproduced by irradiating the optical disk 101 with a focused laser beam to detect the amount or polarization of the reflected laser beam in an optical head 50. A servo-tracking unit (not shown) controls the optical head 50 for tracking in the radial direction of the optical disk 101 as well as the focusing direction of the optical beam.

The data signal reproduced by the optical head 50 is amplified in an amplifier 60, corrected by an equalizer 70 for adapting the amplified signal to the channel defined by the Viterbi detector 10, passed by an anti-aliasing filter 80, and converted into a digital reproduced data Xi in an A/D converter 90. The clock signal for operating the reproducing circuit is generated by a PLL circuit 100 based on the reproduced signal. The encoded data Xi is fed to the Viterbi detector 10 and the error calculation unit 30. The output of the state calculation unit 40 is delivered to a CPU (not shown), which judges the state of the recorded data and determines the recording optical power based on the detected state information. The CPU performs a power calibration or power correction if the state of the recorded data is not suited. The power calibration or correction may be used in a compensating optical power for compensating a main recording optical power to correct the waveform of the mark during recording the mark.

Figure 14:
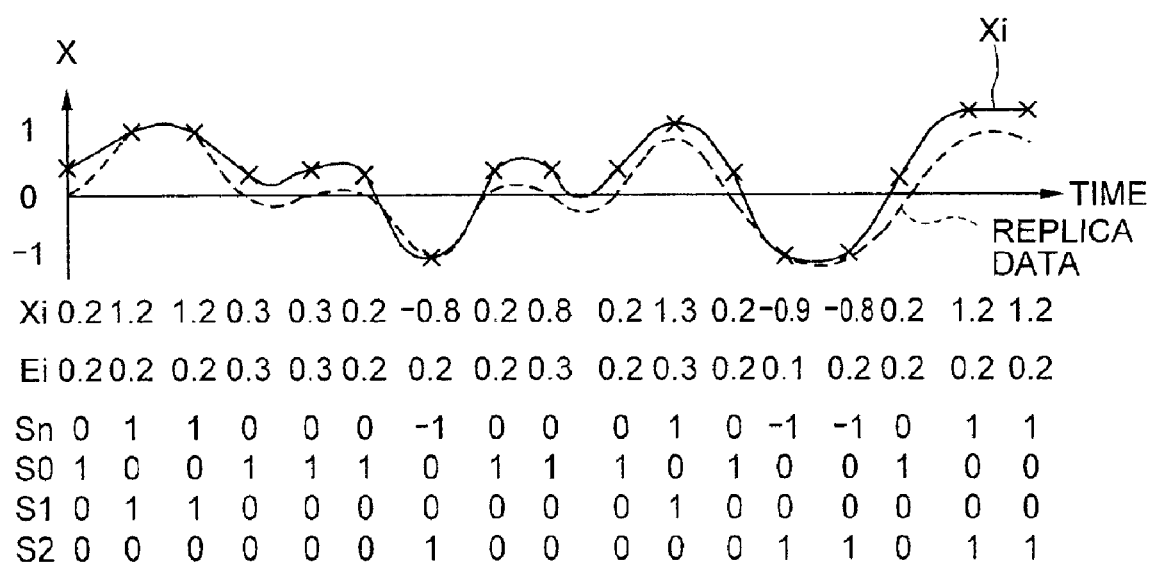
FIG. 14 is a time series graph showing operation of the state calculation unit.

In operation, the error calculation unit 30 receives the pulsing data and the reproduced data Xi such as shown in FIG. 14.

The solid line in FIG. 14 is the reproduced data after the timing adjustment, and the broken line is the reproduced data after Viterbi detection and passing the filter, x-marks on the solid line illustrating the sampling time instants. In addition, data Sn are the results of the normal level judgement unit 20, data S0, S1 and S2 are data of the normal levels 1, 0, −1, respectively, to be integrated in the integrators. In other words, FIG. 14 shows the state of selection for S0, S1 and S2 at each sampling time in a time series diagram.

The sampled data, or reproduced data Xi, are fed to the subtracter 33 of the error calculation unit 30 in synchrony with the pulsing data after equalizing thereof, whereby the subtracter 33 calculates the error data Ei as differences between the reproduced data Xi and the pulsing data. The normal level judgement unit 20 judges the normal level of the reproduced data based on the pulsing data. The state calculation unit 40 integrates the error data Ei up to a specified number of samples in the separate integrators 41 by using the normal level signals S0, S1 and S2 as discriminating signals, calculating based on the integrated data to obtain the amplitude signal VP and the asymmetry signal SYM (or the amplitude level signal LEV in the case of the modified embodiment).

Figure 15:
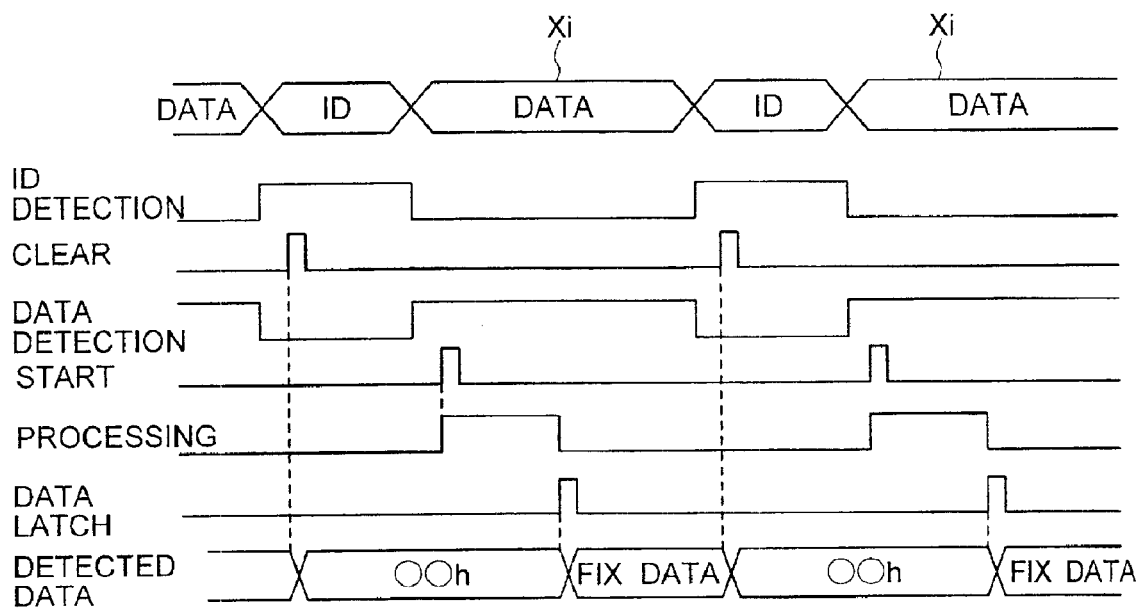
FIG. 15 is a timing chart of operation of the state calculation unit.

Referring to FIG. 15, there is shown a timing chart illustrating the operations from the error calculation to the state detection. The synchronization of data is confirmed by detecting the ID signal. After a specified time length is elapsed from the ID detection, a clear signal is delivered to clear the prior detected data. A data detection signal is used for receiving the detected data, followed by generation of a start signal to initiate discrimination, integration and calculation of the detected data. The detected data 00h are sampled in a specified number. A data latch signal fixes the detected data 00h at the next time instant.

Figure 17:
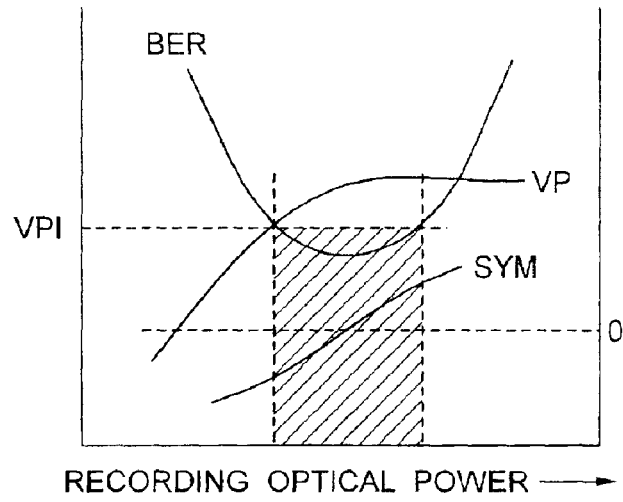
FIG. 17 is a graph showing amplitude VP, asymmetry SYM and bit error rate BER plotted against the recording optical power.

A Referring to FIG. 17, there are shown the bit error rate (BER), the amplitude signal VP and the asymmetry signal plotted against the recording optical power. As shown therein, the bit error rate assumes a substantially minimum at which the asymmetry signal SYM assumes a substantially zero or in the vicinity of zero and at which the amplitude signal VP is larger than a threshold VP1. Accordingly, a hatched area in FIG. 17 is used in the disk drive for determining the recording optical power to achieve an optimum recording state.

In the above embodiment, a single sector is used for the clear signal and the data processing. However, several sectors may be used as a unit. In addition, the timing of data processing is not limited to the ID detection or the detection signal for the detected data.

Figure 18:
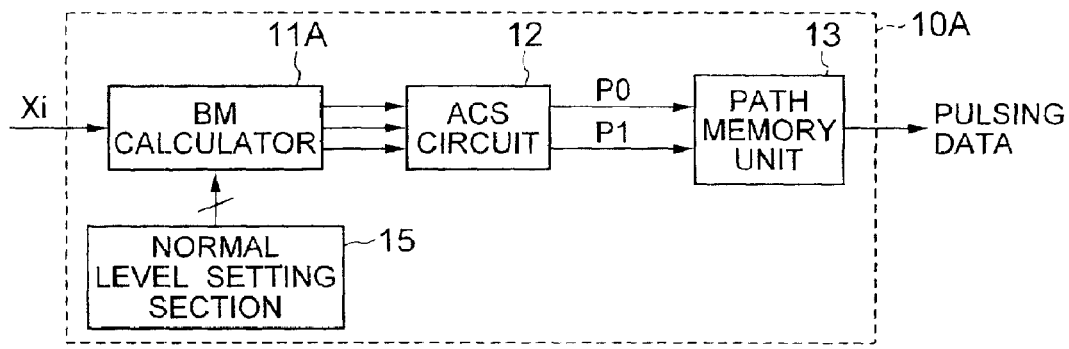
FIG. 18 is a block diagram of another Viterbi detector.
Figure 19:
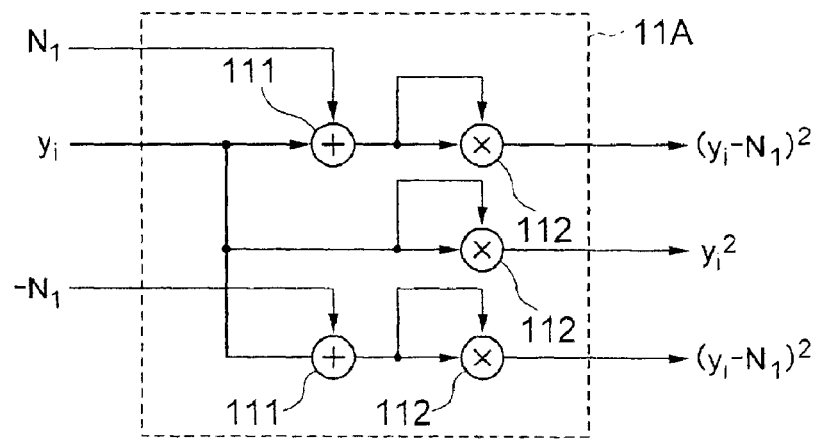
FIG. 19 is a block diagram of the branch metric calculator shown in FIG. 18.

Referring to FIG. 18, a Viterbi detection unit 10A for use in the disk drive unit of another modified embodiment is shown. The Viterbi detection unit 10A of the present embodiment is similar to the Viterbi detection unit 10 of FIG. 4 except for a normal level setting section 15 provided in the present embodiment. The normal level setting section 15 selects the normal level +N1, 0 and −N1 instead of +1, 0 and −1. Referring to FIG. 19, the branch metric calculator 11A shown in FIG. 18 receives the selected level +N1 and −N1 from the normal level setting section 15 to output branch metric signals $(y_i+N1)^2$, $y_i^2$ and $(y_i-N1)^2$. The normal level of the normal level setting section 15 is calculated for achieving smaller error data Ei between the reproduced data and the pulsing data.

In the present embodiment, optimum pulsing data can be obtained from the data reproduced on a ROM disk. In addition, the use of the output from the recording state detection system for obtaining the normal levels obviates an additional circuit.

The recording state detection system according to the embodiments of the present invention provide the following advantages.

(1) The state of the recorded data can be detected in connection with the channel employed. This is because the error data calculated as the difference between the reproduced data and the pulsing data allows a higher-accuracy estimation based on each of the normal levels.
(2) The use of a Viterbi detection unit allows the state detection system to be adapted to any reproducing channel so long as the pulsing data can be obtained in the channel.
(3) Any specific pattern data is not used because the normal level judgement unit is used instead.
(4) The number of calibration operations for the recording optical power can be reduced because the user data can be directly used for detecting the state of the recorded data without using a specific data pattern.

The data correction unit of the present invention is not limited to a Viterbi detector or a unit using a maximum likelihood algorithm, and may be such as having a waveform correction function or data correction function for correcting the reproduced data to have a more accuracy.

Since the above embodiments are described only for examples, the present invention is not limited to the above embodiments and various modifications or alterations can be easily made therefrom by those skilled in the art without departing from the scope of the present invention. For example, a waveform correcting circuit which corrects the waveform of the reproduced data series may be used instead of the Viterbi detection circuit

What is claimed is:

1. A recording state detection system comprising:
   a data correction unit having a data correction function, said data correction unit receiving an encoded sample data series to output a first data series, said encoded sample data series being read from recorded data digitally recorded on a recording disk;
   a normal level judgement unit for receiving said first data series to estimate a normal level for each sample of said encoded sample data series to output a normal level data series;
   an error calculation unit for calculating a difference between each sample of said encoded sample data series and a corresponding data of said first data series to output an error data series;
   a state calculation unit for estimating a state of the recorded data including information of an amplitude of the recorded data based on said error data series and said normal level data series.

2. The recording state detection system as defined in claim 1, wherein said data correction unit uses a Viterbi algorithm.

3. The recording state detection system as defined in claim 1, wherein said data correction unit corrects a waveform of said encoded sample data series.

4. The recording state detection system as defined in claim 1, wherein said state of the recorded data further includes asymmetry information of the recorded data.

5. The recording state detection system as defined in claim 1, wherein said error calculation unit comprises a timing section for delaying said encoded sample data series, a filter for passing therethrough said first data series, and a subtracter for calculating a difference between each sample of said delayed encoded sample data series and a corresponding data of said first data series passed by said filter.

6. The recording state detection system as defined in claim 1, wherein said state calculation unit comprises:
   a plurality of discriminators each for selecting an error data of said error data series based on information of said estimated normal level of said each data,
   a plurality of integrators, each disposed for a corresponding one of said discriminators, for integrating said selected error data to output an integrated data; and
   an amplitude calculator for calculating a difference between said integrated data corresponding to a maximum of said normal levels and a minimum of said normal level to output an amplitude signal;
   a mean calculator for calculating a mean value of said integrated selected error data corresponding to said maximum of said normal levels and said integrated selected error data corresponding to said minimum of said normal levels; and
   a subtracter for calculating a difference between said integrated selected error data corresponding to median of said normal levels and said mean value.

7. The recording state detection system as defined in claim 1, wherein said state calculation unit comprises:
   a plurality of discriminators each for selecting an error data of said error data series based on information of said estimated normal level of said each data,
   a plurality of integrators, each disposed for a corresponding one of said discriminators, for integrating said selected error data to output an integrated data; and
   a mean calculator for calculating a mean valve of said integrated selected error data from said plurality of integrators.

8. A disk drive unit comprising the recording state detection system as defined in claim 1.

* * * * *